Figure 1:
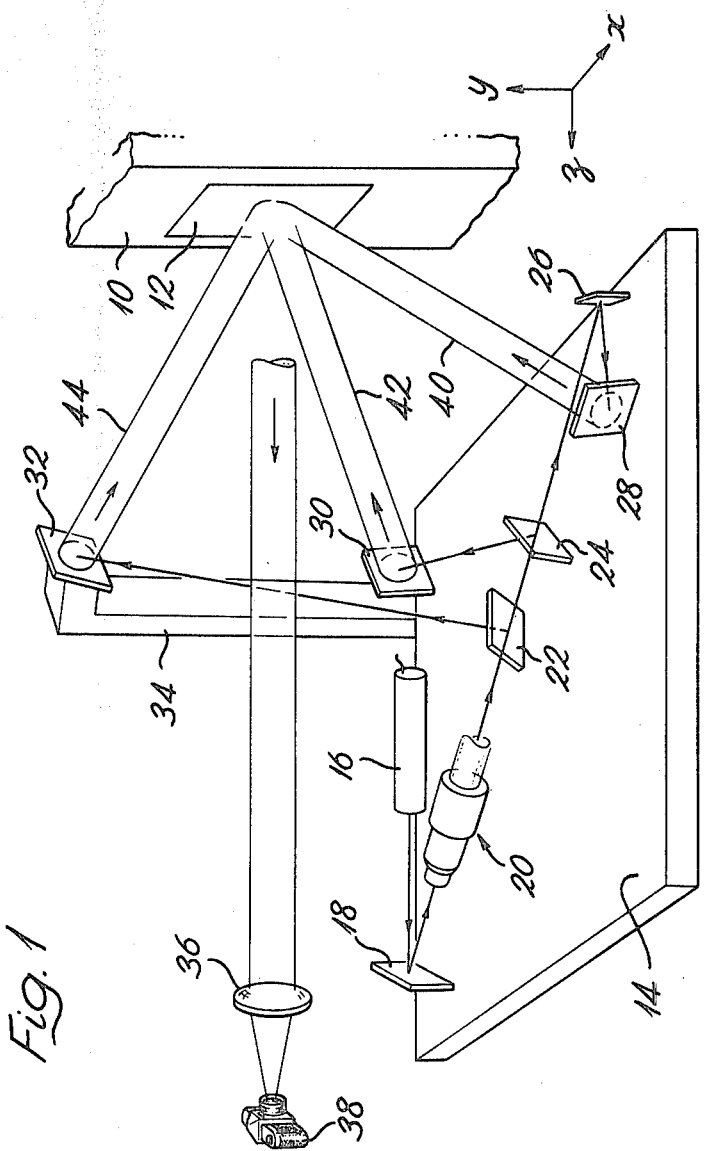

United States Patent [19]

McDonach et al.

[11] Patent Number: 4,474,466
[45] Date of Patent: Oct. 2, 1984

[54] MEASUREMENT OF DEFORMATION

[75] Inventors: Alaster McDonach, Renfrewshire; James McKelvie; Colin A. Walker, both of Glasgow, all of Scotland

[73] Assignee: National Research Development Corporation, London, England

[21] Appl. No.: 356,400

[22] Filed: Mar. 9, 1982

[30] Foreign Application Priority Data

Mar. 11, 1981 [GB] United Kingdom ............... 8107645

[51] Int. Cl.³ .................. G01B 11/16; G01L 1/24
[52] U.S. Cl. ....................................... 356/32; 78/800; 356/35.5; 356/358; 356/33
[58] Field of Search ................. 356/32, 33, 35.5, 358, 356/359, 360, 374, 376; 73/800

[56] References Cited

U.S. PATENT DOCUMENTS 4,170,401 10/1979 Yoder ............................. 356/138 X

FOREIGN PATENT DOCUMENTS

WO79/00320 6/1979 PCT Int'l Appl. .
1143242 2/1969 United Kingdom .
1214124 12/1970 United Kingdom .
1286496 8/1972 United Kingdom .
1454340 11/1976 United Kingdom .

OTHER PUBLICATIONS

Z. Fuzechi, Improved Interference-Hologram Method for Measurement of Displacement, Soviet Physics Tech: Physics, Col. 24, No. 2, Feb. 1979, pp. 230–232.
Real-Time Observation of-in Plane Displacements of Opaque Surfaces, pp. 119–123 of Optics and Laser Technology, Jun. 1973.

Primary Examiner—Vincent P. McGraw
Attorney, Agent, or Firm—Cushman, Darby & Cushman

[57] ABSTRACT

In a strain sensing system in which a strained grating is illuminated with a pair of beams chosen from three possible beams to sense strain in two dimensions, an arrangement is disclosed of two beam splitters, as least one plane mirror, and three tilted mirrors, all fixed to a support plate and which can supply the three required illuminating beams.

8 Claims, 3 Drawing Figures

MEASUREMENT OF DEFORMATION

It is known that real-time observations of the in-plane deformation of a surface can be made by attaching to the surface a two-dimensional grating structure, illuminating the grating with an interference pattern, deforming the surface, and observing the Moire fringes which develop. The interference pattern is usually provided by dividing a beam of laser light and causing the two partial beams to interfere on the surface under investigation, and to sense the strain in the direction determined by the plane in which the two interfering beams lie.

It is also known that, by provision of a third interfering beam in a different plane, strain in three directions across the test surface can be sensed by combining any two illuminating beams. An arrangement suitable for making such a measurement is illustrated in Optics and Laser Technology, June 1973, pages 119 to 123, in a paper by N. Wadsworth et al, FIG. 2. Conveniently the three beams are arranged so that two beam pairs lie in planes having vertical and horizontal intersections with the test surface, which is vertical.

In such an optical arrangement, while most of the required beam splitters and plane mirrors can be arranged on one plane surface, inevitably one mirror must lie at a considerable distance from this plane and is often attached to a rigid arm projecting from a support structure which carries all the other items. The apparatus is therefore extensive in all three dimensions, being generally cube shaped and is consequently inconvenient to transport. Since one of the advantages of a real-time strain sensing system is that it can be transported to a structure under test, such as a bridge, and used to make on-site measurements, bulkiness is a disadvantage. Further, even if the apparatus is dismantled for transport, it is always bulky in its operational form and cannot be used if access to a test surface is limited. Another disadvantage is that the rigidity essential for measurement of very small strains is difficult to achieve.

The present invention provides apparatus by which three beams are generated for use to measure strain in two dimensions across a surface, in which the beam generating apparatus is all close to one plane and may be supported by a single planar support.

According to the invention, a strain sensing apparatus comprises an array of two beam splitters and at least one plane mirror all close to and perpendicular to a reference plane and arranged to receive an input beam of coherent light and to divide said input beam into three partial beams, the input beam and the three partial beams all travelling parallel to said reference plane; and three further plane mirrors arranged to receive the three partial beams respectively and to reflect the partial beams to converge at a position spaced from the reference plane, the reflected partial beams having planes of polarisation which are substantially parallel to each other.

Preferably the two beam splitters, the at least one plane mirror, and the three further plane mirrors are all supported by a plane support plate which determines the reference plane. Conveniently, the support plate also supports a source of coherent light, such as a laser, which provides the input beam of light parallel to the support plate.

Also according to the invention, a method of sensing strain comprising providing an input beam of coherent light; dividing the input beam into three partial beams travelling parallel to a reference plane; reflecting the three partial beams so that the reflected beams converge at a position spaced from the reference plane and have planes of polarisation which are substantially parallel to each other; selecting two of said three partial beams; at said position placing an object having on its surface a two-dimensional regular pattern and deforming the object and the pattern; and receiving from the deformed pattern reflected light originating in said two selected partial beams whereby Moire fringes are formed relating to in-plane strain in the grating along the direction of intersection with the grating of the plane in which the two reflected partial beams lie, said direction corresponding with a direction defined by said pattern.

In use, the support plate is arranged parallel to a surface to be tested. The surface either provides an intrinsic regular two dimensional periodic pattern, or a pattern in the form of a grating, preferably a phase grating such as a relief grating, is attached to the surface. When the strained grating is illuminated by any two of the three incident beams, light reflected perpendicular to the surface contains information about the strain magnitude in the direction defined by the plane containing the two illuminating beams and the grating plane. This light, conveniently, passes through an aperture in the centre of the support plate to a photographic or television camera or other recording device. Since only one pair of the three possible beam pairs can be used at once, shutters are provided to intercept the third beam during a test.

It is to be understood that light reflected normal to the grating arises as a result of diffraction. Typically, but not necessarily, the angle of incidence of the illuminating beams would be less than 30°, and the diffracted orders would be the first orders.

It is believed that it has not previously been possible to provide such a compact apparatus for sensing strain in two dimensions because it has not previously been realised that the essential condition, that the three partial beams illuminating the object must have substantially parallel planes of polarisation, is achievable without the use of polarisation rotators. Theoretical analysis of the inventive apparatus shows that, for an input beam of plane polarised light at any plane of polarisation, it is possible by suitable orientation of the three further plane mirrors to achieve simply and conveniently the required parallel orientation of the planes of polarisation of the three partial beams which illuminate the object under test. However it is a further feature of the present invention that a simplified solution has been found.

In apparatus utilising the simplified solution, the input beam is plane polarised with the E-vector parallel to said reference plane, and the three further plane mirrors are arranged with their respective directions of intersection with said reference plane substantially parallel to each other.

Figure 2:
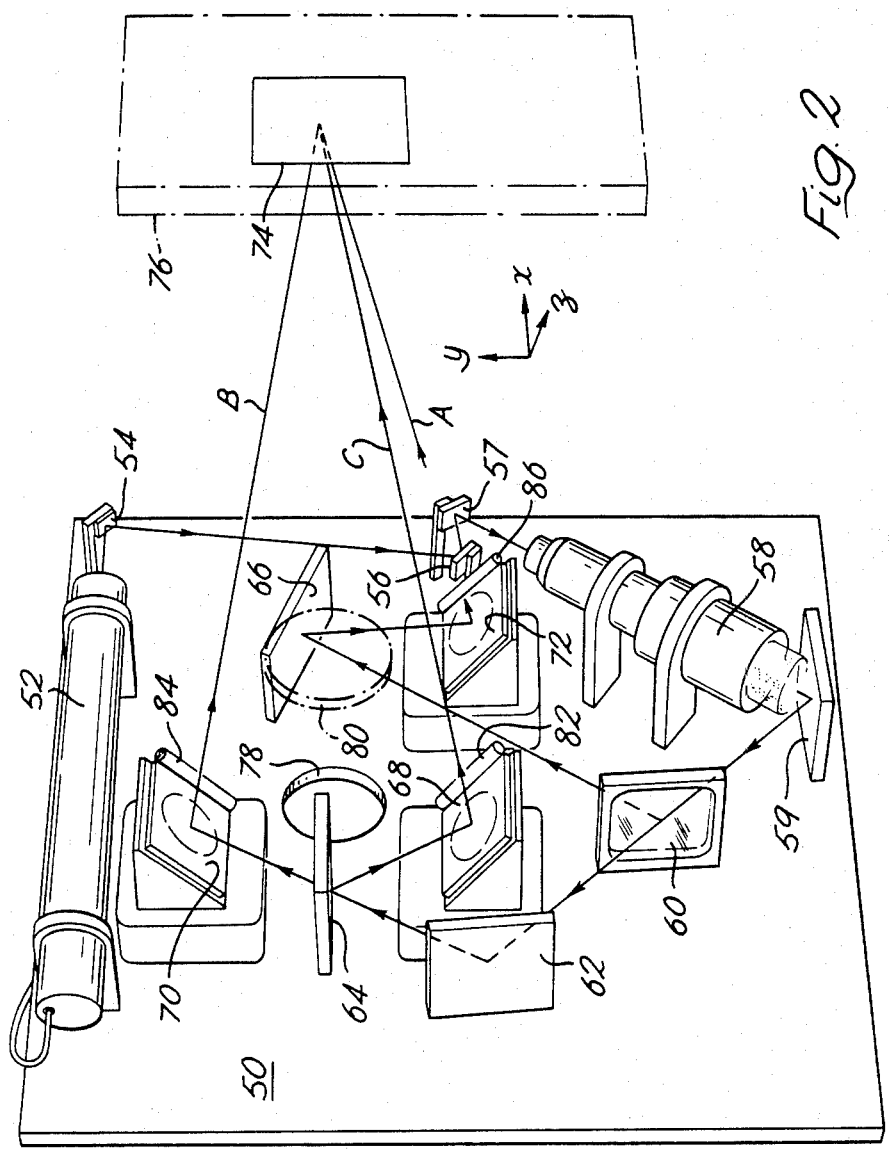

In the accompanying drawings,

FIG. 1 illustrates a prior art arrangement for sensing in-plane deformation in two orthogonal directions, and the invention will be described with reference to:

FIG. 2, which is an improved arrangement for making such a measurement; and

Figure 3:
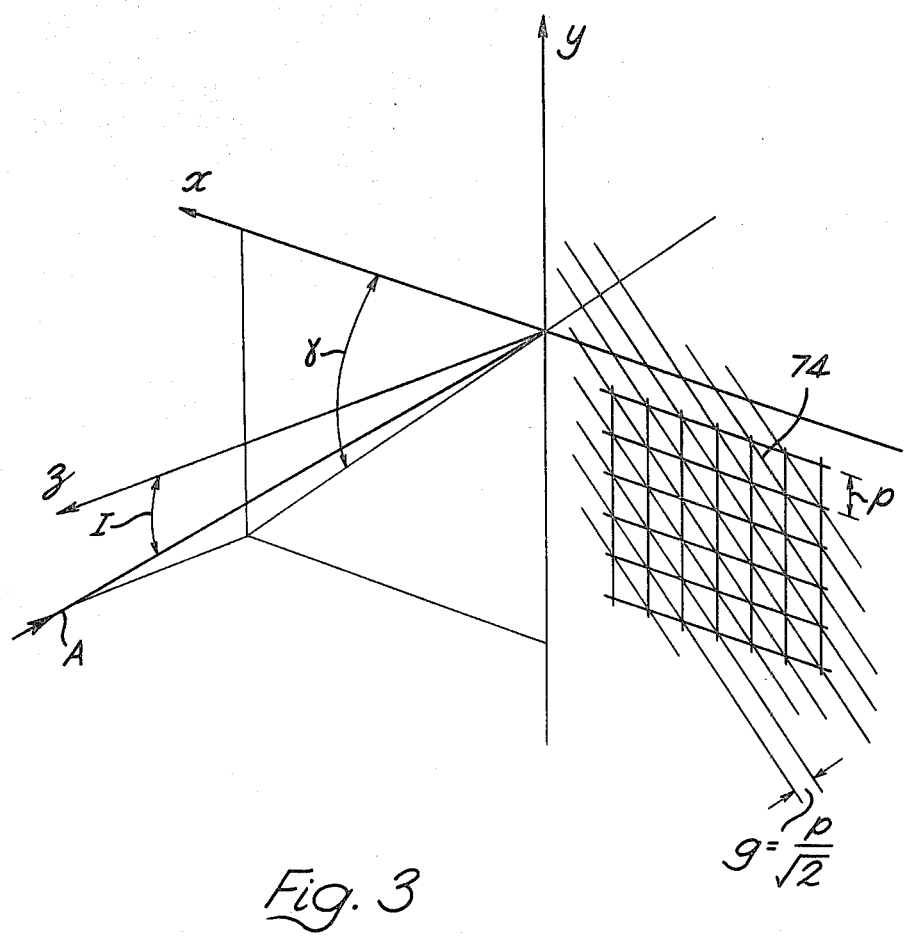

FIG. 3, which indicates the geometrical arrangement of certain variables.

FIG. 1 is identical to a figure published in the Proceedings of the British Society for Strain Measurement Annual Conference 1978, in Paper Number 2 entitled "Fatigue Behaviour of Carbon Fibre Reinforced Plastic Visualised by a Moire Fringe Method" by A. McDonach, J. McKelvie and C. A. Walker.

In FIG. 1 a specimen to be tested 10, illustrated as a vertical bar, is prepared by application to its surface of an amplitude grating 12 which has a periodic pattern in two dimensions of known pitch. Adjacent the specimen is a horizontal support base 14 in the x—z plane which carries a laser 16, a first plane mirror 18, a beam expander 20, first and second beam splitters 22, 24, and second, third and fourth plane mirrors 26, 28, 30, all of these items of apparatus being supported by and close to the surface of the base. A fifth plane mirror 32 is supported at a considerable distance from the base 14 in the y direction by a support arm 34 attached to the base 14. A lens 36 and a camera 38 are arranged to view the grating 12 in the direction normal to the grating surface and can either be attached to further arms carried by the support base 14 (and not illustrated) or by a separate structure.

In use, the output beam from laser 16 is reflected by the first mirror 18 through the beam expander 20 to the first beam splitter 22. The transmitted beam passes to the second beam splitter 24 from which one beam (the transmitted beam) is reflected by the plane mirrors 26 and 28 to form a first partial beam 40 which illuminates the grating 12; the other beam (reflected by the beam splitter 24) is reflected by the mirror 30 to form a second partial beam 42 which illuminates the grating 12. The beam reflected by the first beam splitter 22 passes away from the plane of the base 14 to the mirror 32 and is reflected to form a third partial beam 44 which illuminates the grating 12.

In use, any two partial beams are used to determine strain in the direction along which the plane in which the two beams lie intersects the grating surface by placing a shutter (not shown) in the path of the third beam. The grating 12 is therefore illuminated by two coherent beams of radiation so that interference fringes are formed. If the specimen 10 is strained, the grating 12 is deformed and the two patterns, (the interference fringes and the periodic pattern on the grating), form Moire fringes which can be used to measure the magnitude of the strain. The fringes are recorded by the camera 38 through the lens 36. The three pairs of beams therefore allow strain in three directions on the specimen surface to be sensed.

The area of the specimen over which strain can be sensed is determined by the area illuminated, therefore beam diameters as large as possible are essential. This places limitations on the arrangement of the items of apparatus.

The arrangement illustrated in FIG. 1 is optically identical to that described by Wadsworth in the paper referred to above. The inconvenience of the positioning of the mirror 32 on a support arm is clear.

FIG. 2 illustrates apparatus according to the present invention using the simplified solution to the theoretical analysis.

A planar base plate 50, shown in a vertical position, and defining the x—y plane, carries a laser 52, three small plane input beam mirrors 54, 56, 57, a beam expander 58, first and second beam splitters 60, 64, and three large plane mirrors 59, 62, 66. All of the aforementioned mirrors and beam splitters are arranged perpendicular to the support base 50. The base plate 50 also carries three further large plane mirrors 68, 70, 72.

The base plate is placed parallel to and spaced from a quasi-sinusoidal phase grating 74 attached to the surface of a test object 76. The grating 74 is aligned with a central aperture 78 in the base plate 50, and there is a lens 80 between the grating 74 and the aperture. A camera (not shown) receives light through the lens 80 and aperture 78; the camera conveniently provides an image of the object as well as of the interference fringes.

Each further large plane mirror 68, 70, 72 is provided with a retractable shutter, 82, 84, 86, shown in highly schematic form—in practice an opaque stop could be placed at any suitable position between the object and the beam splitter 60, 64 to intercept the appropriate light beam.

In operation, the laser 52 provides an input beam having both its direction of travel and its plane of E-vector polarisation parallel to the base plate 50. The input beam is reflected by the small mirrors 54, 56, 57 through the beam expander 58, and the expanded beam is reflected by the mirror 59 to the beam splitter 60. The beam reflected by the beam splitter is further reflected by the large plane mirror 66 to the further plane mirror 72, as a first partial beam. The beam transmitted by beam splitter 60 is reflected by mirror 62 to the second beam splitter 64 which reflects a second partial beam to the further plane mirror 68. The beam transmitted by beam splitter 64 is incident on the further plane mirror 70 as the third partial beam.

Since the input beam has its axis parallel to the base plate, and since all reflections and transmissions occur at surfaces perpendicular to the base plate, the planes of polarisation of the three partial beams remain parallel to the base plate, and no phase changes are introduced by the reflections. The path differences between the three partial beams must also be within the coherence length of the laser, as is conventional in fringe-forming apparatus.

The three further plane mirrors 68, 70, 72 are shown supported by wedges to indicate that their planes are not perpendicular to the support plate. Mirrors 68 and 72 are tilted to reflect the respective partial beams upwards and inwards as beams C and A respectively and mirror 70 is tilted to reflect its partial beam downwards and inwards as beam B towards the grating 74. The reflected partial beams A, B and C coincide on the grating.

While in the figure the light beams are indicated as rays, the intersections of the circular beams with mirrors 68, 70 and 72 are shown.

To maximise the contrast in the interference fringes, the polarisation directions of the interfering beams must be parallel, and the governing constraints on the arrangement of the components to produce parallel planes of polarisation in the interfering beams passing through the aperture 78 may be generalised as follows:

if the light originating in partial beam A passes through the aperture 78 with its plane of polarisation making an angle $P_A$ with the x-axis, then the light originating in partial beams B and C must be made to have their planes of polarisation making the same angle with that axis. Considering partial beam B, having, prior to reflection at mirror 70, a plane of polarisation at some angle $P_B$ to the x-axis, then it is required to orientate the plane to the correct angle by means of altering the following:

$\theta_B$, (being the angle of partial beam B to the x-axis prior to the reflection), $\alpha_B$, (being the angle made by the intersection of the mirror 70 and the reference plane with the x-axis) and $\beta_B$, (being the angle made by the plane of mirror 70 and the reference plane), with the constraint that the azimuth in the x—y plane, and the angle of inclination to the z-axis, of the reflected partial beam B must conform to a required geometry defined by the grating pitch.

This requirement will be described with reference to FIG. 3, which indicates the incidence of partial beam A on the grating 74, which is shown schematically to have pitch p in the y direction. If the angle of inclination of partial beam A to the z axis is I, then $$\sin I = n\lambda/g$$

where:

n is nonzero integer, being a diffracted order number (usually 1 or −1)

$\lambda$ is the wavelength of the light g is the pitch of the pattern measured in the direction of the projection of the partial beam in the xy plane, (it being understood that a bi-directional grid has effective pitches at other than the two major directions; e.g. an orthogonal grid of pitch 'p' has effective gratings of pitch 'g' at ±45° to the major directions and others at ±tan ½, etc.)

For 'orthogonal bi-directional grids' in which one major direction coincides with the x-axis, a further requirement is:

$$\tan \gamma = (i/j)$$

where:

$\gamma$ is the angle made by the projection of the partial beam, in the xy plane, with the x-axis.

i = an integer.

j = an integer.

the usual configuration of the three beams giving i/j = 1 or −1. For example, the three values of $\gamma$ would be +45°, −135°, +135° (measured counterclockwise looking from the apparatus), for the three partial beams A, B, C, respectively in the configuration of FIG. 2.

There are therefore three required quantities of the reflected partial beam B, viz., its angles of azimuth and inclination and its polarisation orientation, each of which will alter as the values of $\theta_B$, $\alpha_B$, and $\beta_B$, are independently altered. For partial beam B we have the generalised independent relations:

angle of azimuth = $f_1$ ($\theta_B$, $\alpha_B$, $\beta_B$)

angle of inclination = $f_2$ ($\theta_B$, $\alpha_B$, $\beta_B$)

angle of polarisation orientation = $f_3$ ($\theta_B$, $\alpha_B$, $\beta_B$, $P_B$)

where f indicates a function of the three variables. The three equations have, in general, some mutually satisfactory solution; there are three independent equations in three variables, since $P_B$ is pre-determined.

The relationships are complex; for example, one of the relations is (for a given $\beta_B$).

$$\alpha_B = \tan^{-1} \left[ \frac{1 - (2 + [\tan \sin^{-1}(I_B)]^{-2})^{\frac{1}{2}} \cos \theta_B}{1 + (2 + [\tan \sin^{-1}(I_B)]^{-2})^{\frac{1}{2}} \sin \theta_B} \right]$$

where $I_B$ is the angle of inclination of reflected partial beam B to the z-axis.

Similar reasoning holds for partial bean C, and we conclude that no matter what the values of $P_A$, $P_B$, $P_C$, there exists an arrangement which gives the desired final result.

However, many such arrangements will be impractical, in that they will involve very large angles of incidence, implying unacceptably large mirrors if illumination beams of substantial size (e.g. several centimeters) are to be provided.

It will be obvious from the above that the determination of a suitable geometry with three final mirrors in such a compact arrangement is a matter of great difficulty in the general case, when polarisation rotations may occur at the two beam-splitters and at least one plane mirror, prior to reflection at the three final mirrors 68, 70, 72.

According to the present invention, the use of laser light both E-vector polarised and travelling parallel to the support plate 50 until the light reaches the three final mirrors 68, 70, 72 simplifies the situation. It can be shown that this arrangement leads to a simple solution of the equations, in which the angles $\alpha$ for the three mirrors are equal, i.e. the mirrors intersect the reference plane along parallel lines, as shown in FIG. 2, and in which the angles $\theta$ are not constrained, but may be chosen as may be most convenient.

Reference has been made to the requirement that in the interfering beams (i.e. after reflection by grating 74) the planes of polarisation must be parallel for maximum contrast in the fringes. It is to be understood that precise parallelism is not required. Since the object is to maximise interference between two vector quantities, the cosine rule applies, and a small angle between the vectors causes only a small decrease in maximum amplitude. Planes of polarisation differing from the required direction of say 3° are quite acceptable, but a deviation of say 30° would cause an cause an intolerable loss of contrast. Therefore with typical angles of incidence of the illuminating beams, it is a sufficient approximation for the planes of polarisation in the incident beams A, B and C to be parallel, because the rotations of polarisation introduced into each beam by reflection by the grating are not large.

In use, the apparatus is correctly aligned, and one of the mirrors 68, 70, 72 is screened by its respective shutter 82, 84, 86. The other two beams illuminate the strained grating 74, interfere, and with the strained grating produce Moire fringes related to strain along the direction parallel to the plane in which the beams from the two unshuttered mirrors lie. For example, if mirror 72 is shuttered, the partial beams from mirrors 68 and 70 will interfere and give fringes indicating the strain applied to grating 74 in the y direction. The fringes are recorded through the aperture 78 and lens 80 by the camera. Each pair of beams is used in turn to provide a record of strain.

As an alternative to use of apparatus according to the invention in which control of plane of polarisation of the beams illuminating a test grating is achieved by careful arrangement of the apparatus, a laser beam at any other polarisation direction could be used. The direction would then probably alter at the reflecting surfaces, and the three partial beams incident on the mirrors 68, 70, 72 would have different directions of polarisation. A solution of the equations is still theoretically possible, although large angles of incidence and therefore large mirrors would probably be required.

An alternative solution would be to place a polarisation rotator in each of the three beams reflected by the mirrors to align the polarisations. The disadvantage is then a loss of illuminating intensity, considerable additional expense, and the major disadvantage that high-quality polarisers are of limited area, e.g. about 1 centimeter in diameter, so that the illuminated area of the grating would be severely restricted. Use of polarisation filters in the diffracted beams, together with a much higher power laser is a further option, but such devices are expensive, heavy, and bulky, so that portability of the equipment would be restricted; moreover, with such an arrangement, difficulties would arise in arranging for approximate equality of intensity of interfering beams, which is a further requirement for good contrast.

A further advantage of the use of an input beam both travelling and polarised parallel to a reference plane is that no phase change is introduced by either a metallic or a dielectric reflector whose plane is perpendicular to the reference plane; either can be used.

Typically the laser 52 is a helium neon laser of 5 milliwatts power operating at a wavelength of 632.8 nanometers, and the grating 74 has a pitch in the x and y directions of 0.002 mm. Strains of the order of $10 \times 10^{-6}$ can be measured.

We claim:

1. Strain sensing apparatus comprises an array of two beam splitters and at least one plane mirror all close to and perpendicular to a reference plane and arranged to receive an input beam of coherent light and to divide said input beam into three partial beams, the input beam and the three partial beams all travelling parallel to said reference plane;

and three further plane mirrors arranged to receive the three partial beams respectively and to reflect the three partial beams to converge at a position spaced from the reference plane, the reflected partial beams having planes of polarisation which are substantially parallel to each other.

2. Strain sensing apparatus according to claim 1 in which the two beam splitters, the at least one plane mirror, and the three further plane mirrors are all supported by a plane support plate which determines the reference plane.

3. Strain sensing apparatus according to claim 1 in which the support plate also supports a source of coherent light arranged to provide said input beam of light parallel to the support plate.

4. Strain sensing apparatus according to claim 1 in which said input beam is plane polarised with the E-vector parallel to said reference plane, and the three further plane mirrors are arranged with their respective directions of intersection with said reference plane substantially parallel to each other.

5. Strain sensing apparatus comprising a plane support plate which supports:

(a) a source of coherent light which provides an input light beam parallel to said plate;

(b) plane reflecting means perpendicular to said plate arranged to reflect the input beam;

(c) a beam expander which receives the reflected input beam and provides an expanded light beam parallel to said plate;

(d) a first plane mirror perpendicular to said plate which reflects the expanded beam;

(e) a first beam splitter perpendicular to said plate which receives the reflected, expanded beam and reflects a first split beam and transmits a second split beam;

(f) a second plane mirror perpendicular to said plate which reflects the first split beam as a first partial beam;

(g) a first further plane mirror which receives the first partial beam;

(h) a third plane mirror perpendicular to said plate which reflects the second split beam;

(i) a second beam splitter perpendicular to said plate which receives the reflected second split beam and reflects a part of the second split beam as a second partial beam and transmits a part of the second split beam as a third partial beam;

(j) a second further plane mirror which receives the second partial beam;

(k) a third further plane mirror which receives the third partial beam;

(l) and first, second and third opaque shutters operable to intercept light falling respectively on the first, second and third further plane mirrors;

the first, second and third further plane mirrors making such angles with the support plate as to respectively reflect the first, second and third partial beams to converge at a position spaced from the plane support plate;

and the support plate having an aperture between the first, second and third further plane mirrors.

6. Strain sensing apparatus according to claim 5 in which the source of coherent light provides an input beam which is plane polarised with the E-vector parallel to the plane support plate; and the first, second and third further plane mirrors are arranged with their respective directions of intersection with the support plate substantially parallel to each other.

7. A method of sensing strain comprises providing an input beam of coherent light;

dividing the input beam into three partial beams travelling parallel to a reference plane;

reflecting the three partial beams so that the reflected beams converge at a position spaced from the reference plane and have planes of polarisation which are substantially parallel to each other;

selecting two of said three partial beams;

at said position placing an object having on its surface a two-dimensional regular pattern and deforming the object and the pattern;

and receiving by reflection from the deformed pattern light from said two selected partial beams whereby Moire fringes are formed relating to in-plane strain in the grating along the direction of intersection with the grating of the plane in which the two reflected partial beams lie.

8. A method of sensing strain according to claim 7 comprising providing said input beam so as to be plane polarised with its E-vector parallel to said reference plane;

and reflecting the three partial beams by plane mirrors arranged with their respective directions of intersections with said reference plane substantially parallel to each other.

* * * * *